United States Patent
Long

(10) Patent No.: US 6,937,234 B1
(45) Date of Patent: Aug. 30, 2005

(54) COMBINING A PLURALITY OF IMAGES AND TRANSFORMING AN IMAGE HAVING ASSOCIATED META-DATA

(75) Inventor: Timothy Merrick Long, Lindfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 491 days.

(21) Appl. No.: 09/612,440

(22) Filed: Jul. 7, 2000

(30) Foreign Application Priority Data

Jul. 9, 1999 (AU) ............................................. PQ1525

(51) Int. Cl.[7] .............................................. G06F 17/00
(52) U.S. Cl. ..................................... 345/418; 348/745
(58) Field of Search .................... 725/37; 345/620–621, 345/624, 418, 501, 522; 348/745–748; G06T 3/00; G06F 5/00; H04N 1/387; G01F 13/00

(56) References Cited

U.S. PATENT DOCUMENTS

| 5,586,326 A | 12/1996 | Ryu et al. .................... 395/701 |
| 6,141,012 A * | 10/2000 | Bollman et al. ............. 345/418 |
| 6,249,600 B1 * | 6/2001 | Reed et al. .................. 382/154 |
| 6,301,393 B1 * | 10/2001 | Spaulding et al. .......... 382/240 |
| 6,427,020 B1 * | 7/2002 | Rhoads ........................ 382/100 |
| 6,456,340 B1 * | 9/2002 | Margulis ..................... 348/745 |

FOREIGN PATENT DOCUMENTS

WO 2000/36497 6/2000

* cited by examiner

*Primary Examiner*—Kee M. Tung
*Assistant Examiner*—Anthony Blackman
(74) *Attorney, Agent, or Firm*—Fitzpatrick, Cella, Harper & Scinto

(57) ABSTRACT

The method combines a plurality of images. The images each have associated meta-data comprising meta-data element(s) having merging attribute tag(s). The merging attribute describes an action to be taken with the corresponding meta-data element when the images are combined. The method first reads (104) the attribute(s) of the images to identify the action(s) and then combines the meta-data elements of the images in accordance with said action(s) In another embodiment, the method transforms an image.

28 Claims, 3 Drawing Sheets

COMBINING A PLURALITY OF IMAGES AND TRANSFORMING AN IMAGE HAVING ASSOCIATED META-DATA

FIELD OF INVENTION

The present invention relates generally to a method and apparatus for combining a plurality of images and transforming an image having associated meta-data. The invention also relates to a computer program product including a computer readable medium having recorded thereon a computer program for combining a plurality of images and transforming an image having associated meta-data.

BACKGROUND ART

Many digital image formats include meta-data which records aspects of an image that are in addition to the raw digital image pixel data Examples of such attributes include a copyright notice, type of capture device, flash usage, type of lens, date of capture, programs the image has been edited with, regions of interest, and more. In many image formats there are both well known meta-data items which, because of their standard-mandated identifiers and format, can be programmatically processed, as well as application specific meta-data items. These application specific meta-data items may be related to only one or a few programs or may be end-user invented and thus not programmatically interpretable by any particular application.

There exist many computer application programs which combine digital images in various ways, or transform a single image. Examples include image editors such as Adobe PhotoShop. Other examples include panorama stitching applications that combine two or more partially overlapping images of the same scene into a single larger digital image. When these applications produce a new digital image from one or more original digital images they must make decisions on what meta-data from the original image(s) is passed to the new image, what meta-data is discarded, or modified in some way. Typically, meta-data copying actions may be taken on specific metadata elements, which have well known characteristics. For example, a program may preserve all copyright notices from all source images in the composite image because the characteristics of copyright notices are known to the application designer. However, these applications suffer from the disadvantage of being inflexible in that they are limited to specific well known meta data elements.

SUMMARY OF THE INVENTION

According to one aspect of the invention there is provided a method of combining digital image meta-data by storing self-describing attribute tags with one or more meta-data elements, each such attribute describing the action to be taken with this meta-data element and a similarly identified meta-data element from a second digital-image when the two images are combined.

According to another aspect of the invention there is provided a method of updating meta-data of an digital image by storing self describing attribute tags with one or more meta-data elements, each such attribute describing the action to be taken with this meta data element when the digital image is transformed.

According to another aspect of the invention there is provided a method of combining a plurality of images, wherein one or more of said plurality of images each have associated therewith metadata comprising at least one metadata element having at least one attribute tag which describes an action to be taken with said meta-data element when said plurality of images are combined, the method comprising the steps of: reading said at least one attribute to identify said action; and combining the meta-data elements of the plurality of images in accordance with said action.

According to another aspect of the invention there is provided a method of transforming an image, wherein said image has associated therewith meta-data comprising at least one meta-data element having at least one attribute tag which describes an action to be taken with said meta-data element when said image is transformed, the method comprising the steps of: reading said at least one attribute to identify said action; and updating the at least one meta-data element of the image in accordance with said action.

According to another aspect of the invention there is provided apparatus for combining digital image meta-data by storing self describing attribute tags with one or more meta-data elements, each such attribute describing the action to be taken with this meta-data element and a similarly identified meta-data element from a second digital-image when the two images are combined.

According to another aspect of the invention there is provided apparatus for updating meta-data of an digital image by storing self describing attribute tags with one or more meta-data elements, each such attribute describing the action to be taken with this meta-data element when the digital image is transformed.

According to another aspect of the invention there is provided apparatus for combining a plurality of images, wherein one or more of said plurality of images each have associated therewith meta-data comprising at least one meta-data element having at least one attribute tag which describes an action to be taken with said metadata element when said plurality of images are combined, the apparatus comprising: means for reading said at least one attribute to identify said action; and means for combining the meta-data elements of the plurality of images in accordance with said action.

According to another aspect of the invention there is provided apparatus for transforming an image, wherein said image has associated therewith meta-data comprising at least one metadata element having at least one attribute tag which describes an action to be taken with said meta-data element when said image is transformed, the apparatus comprising: means for reading said at least one attribute to identify said action; and means for updating the at least one meta-data element of the image in accordance with said action.

According to another aspect of the invention there is provided computer readable medium including a computer program for combining digital image meta-data by storing self-describing attribute tags with one or more meta-data elements, each such attribute describing the action to be taken with this meta-data element and a similarly identified meta-data element from a second digital-image when the two images are combined.

According to another aspect of the invention there is provided computer readable medium including a computer program for updating meta-data of an digital image by storing self describing attribute tags with one or more meta-data elements, each such attribute describing the action to be taken with this meta-data element when the digital image is transformed.

According to another aspect of the invention there is provided computer readable medium including a computer program for combining a plurality of images, wherein one or more of said plurality of images each have associated therewith meta-data comprising at least one meta-data element having at least one attribute tag which describes an action to be taken with said meta-data element when said plurality of images are combined, the computer program comprising: code for reading said at least one attribute to identify said action; and code for combining the meta-data elements of the plurality of images in accordance with said action.

According to another aspect of the invention there is provided computer readable medium including a computer program for transforming an image, wherein said image has associated therewith meta-data comprising at least one meta-data element having at least one attribute tag which describes an action to be taken with said meta-data element when said image is transformed, the computer program comprising: code for reading said at least one attribute to identify said action; and code for updating the at least one meta-data element of the image in accordance with said action.

BRIEF DESCRIPTION OF THE DRAWINGS

A number of preferred embodiments of the present invention will now be described with reference to the drawings, in which.

DETAILED DESCRIPTION

In the preferred embodiments any digital image meta-data elements may be augmented with an attribute which describes how that meta-data element from multiple images should be merged when the images are merged, or a new transformed image is created. The meta-data associated with a digital image is preferable recorded in XML format in a portion of the digital image. However, that many other methods of storing metadata in a digital image exist and could be used without departing from the spirit and scope of the invention. For example, the tag method of the TIFF image file format and the Structured Storage mechanism of the Flashpix image file format. And example of, meta-data in XML format could be:

```
<?xml version="1.0">
<PHOTO>
    <Photo_Number>62</Photo_Number>
    <Lens>EF85mm f/1.2L USM</Lens>
    <Creator>Takashi Mochizuki</Creator>
    <Copyright>Takashi Mochizuki, 1999</Copyright>
    <ModelRelease desc="Man in blue suit"
        release="yes" ref="MR45621" />
    <EyeLocation>123 546 130 600</EyeLocation>
    . . .
<PHOTO>
```

The preferred embodiment adds attributes to each XML element of the digital image meta-data to describe how that element should be combined with like elements of other digital images when those images are combined. Similar mechanisms could be employed in other XML based meta-data storage formats. The preferred embodiment allows the following merging attributes with the given interpretation:

discard These elements should be discarded and no element of this name placed in the final image upon transformation or combination. An example of an element of this type is a region of interest which will become invalid through most transformations.

keepboth These elements should each be kept. Both should be placed in the final image. An example of this type of element is a legal notice such as a model release note.

keepsame These elements should be kept as a single attribute if they have the same value, else both should be discarded. Example of these elements are camera capture characteristics such as whether a flash was used and date of capture.

keepone One of these elements should be chosen and copied to the final image at the application's discretion. Examples of these elements are captions or titles.

Other merging attributes are possible.

In the preferred embodiment the default action when no explicit merge attribute is supplied with a meta-data element is the keepsame action.

An example of some digital-image meta-data with these attributes incorporated could be:

```
<?xml version="1.0">
<PHOTO>
    <Photo_Number>62</Photo_Number>
    <Lens>EF85mm f/1.2L USM</Lens>
    <Creator merge="keepboth">Takashi Mochizuki</Creator>
    <Copyright merge="keepboth">Takashi Mochizuki,
    1999</Copyright>
    <ModelRelease merge="keepboth" desc="Man in blue suit"
        release="yes" ref="MR45621" />
    <EyeLocation merge="discard">123 546 130 600</EyeLocation>
</PHOTO>
```

Figure 1A:
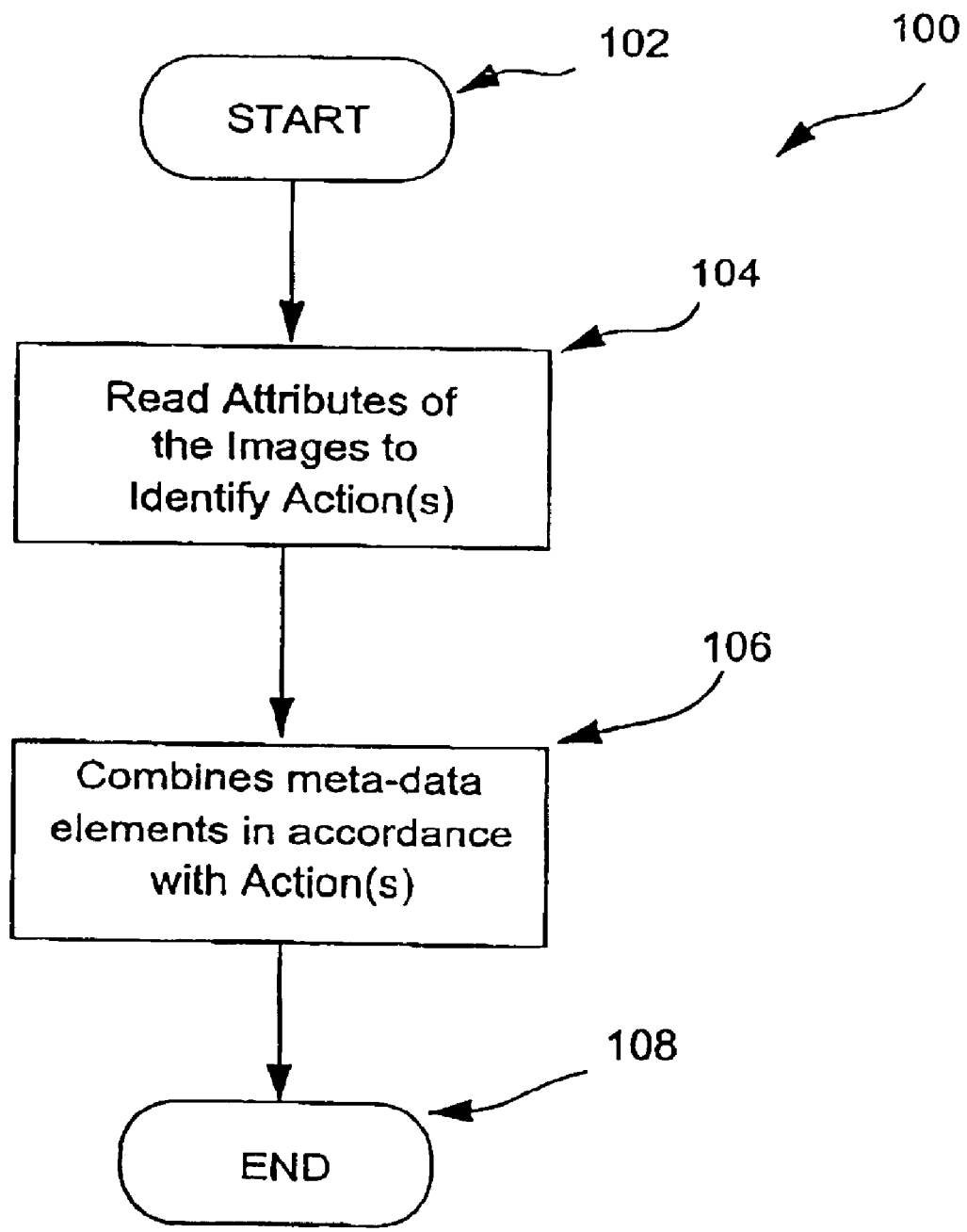
FIG. 1A shows a flow chart of a method of combining a plurality of images in accordance with a preferred embodiment.

Turning now to FIG. 1A, there is shown a method 100 of combining a plurality of images. The images have associated therewith meta-data comprising at least one meta-data element having at least one attribute tag. These attribute tags describe a merging action to be taken with the meta-data element when the plurality of images are combined, as previously described. Preferably, this meta data is recorded in XML format in a portion of the image. The meta data can be automatically or manually constructed using an XML editor of a known type. The method 100 preferably forms a sub-module of a software application, which can combine images in various ways. The method 100 is called by the software application when two or more images are in the process of being combined. The method 100 starts at step 102 where the meta data of all the images to be combined are individually retrieved and any necessary parameters are initialised. During the next step 104, the method 100 reads each meta data associated with each image and identifies the merging attributes of the meta-data elements. In the case where a meta-data element has no merging attributes, the method 100 supplies the meta-data element in question with a default merging attribute. The method reads the merging attributes of the common meta-data elements of the images and identifies the actions to be performed. By utilising a common XML format, the action indicated by the merging attributes of each common meta-data element of the images should be the same. The method then proceeds to step 106, where the method combines the meta-data elements of the plurality of images in accordance with the identified actions and stores the combined meta-data elements as meta data associated with the combined image. The manner in which these meta data elements are combined are described above. The method then terminates 108 and returns to the main software application.

Figure 1B:
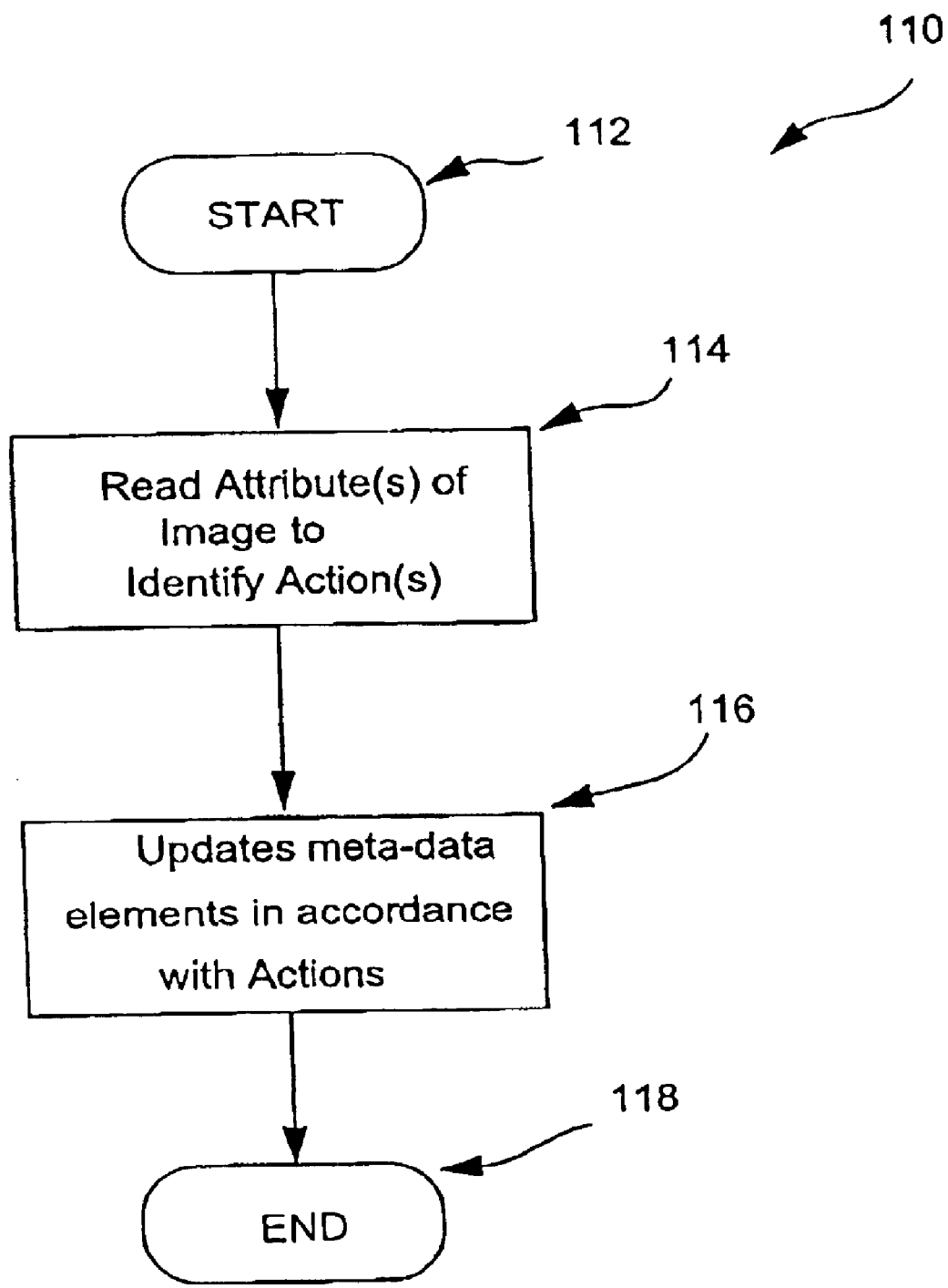
FIG. 1B shows a flow chart of a method of transforming an image in accordance with a preferred embodiment.
Figure 2:
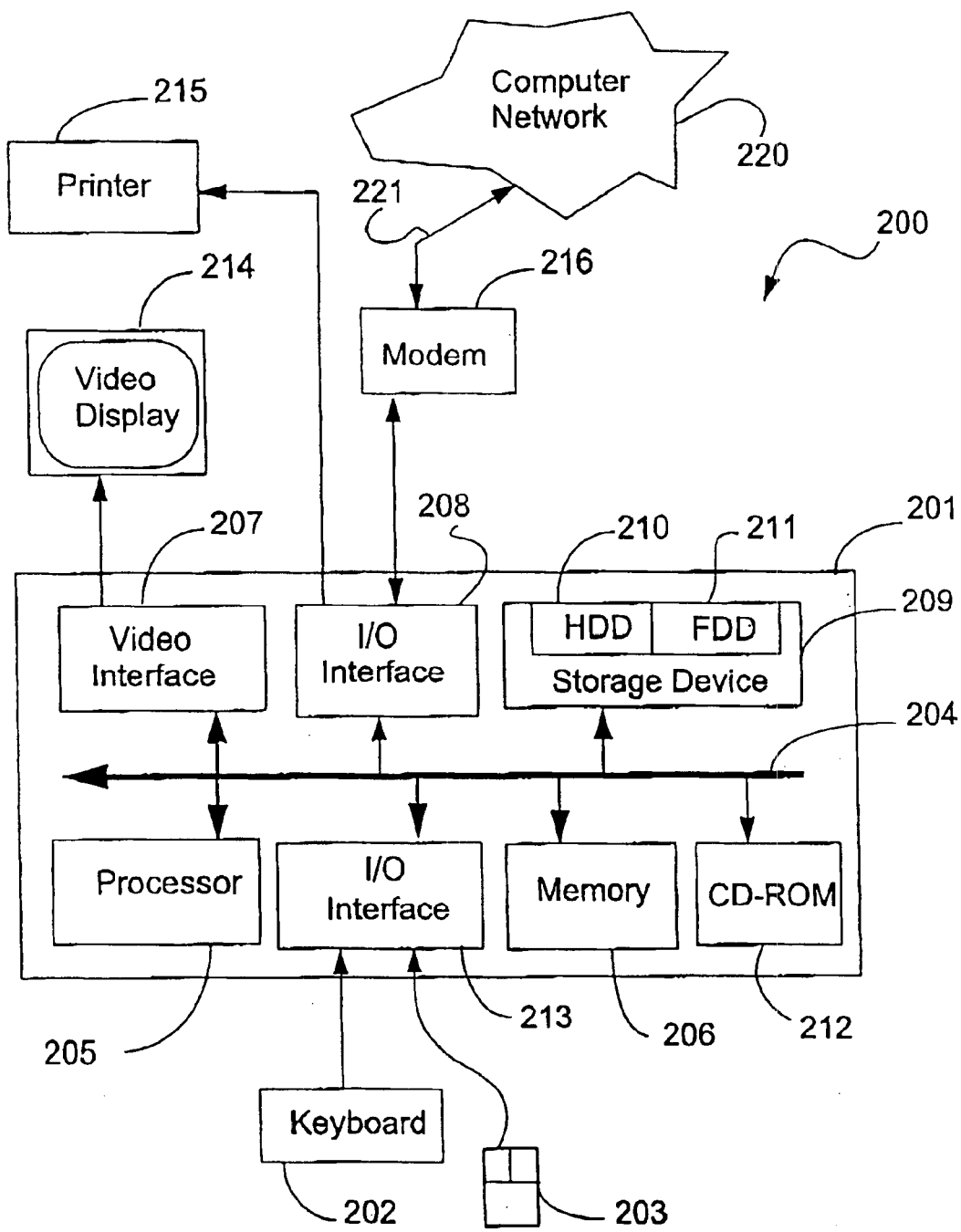
FIG. 2 shows a general purpose computer for implementing the preferred methods.

Turning now to FIG. 1B, there is shown a method 100 of transforming an image. The image has associated therewith meta-data comprising at least one meta-data element having at least one merging attribute tag. These merging attribute tags describe an action to be taken with said meta-data element when the image is transformed, as previously described. Preferably, this meta data is recorded in XML format in a portion of the image. The meta data can be automatically or manually constructed using an XML editor of a known type. The method 110 preferably forms a sub-module of a software application, which can transform an image in various ways. The method 110 is called by the software application when an image is in the process of being transformed. The method 110 starts at step 112 where the meta data of the image is retrieved and any necessary parameters are initialised. During the next step 114, the method 110 reads the meta data associated with the image and identifies the merging attributes of the meta-data elements. In the case where a meta-data element has no merging attributes, the method 110 supplies the meta-data element in question with a default merging attribute. The method reads the merging attributes of the image and identifies the actions to be performed. The method then proceeds to step 116, where the method updates the meta-data elements of the image in accordance with the identified actions and stores the updated meta-data elements as meta data associated with the transformed image. The manner in which these meta data elements are updated are described in more detail above. The method then terminates 118 and returns to the main software application.

The preferred methods of combining a plurality of images and transforming an image are preferably practiced using a conventional general-purpose computer system 200, wherein the processes may be implemented as software, such as an application program executing within the computer system 200. In particular, the steps of the preferred methods of combining a plurality of images and transforming an image are effected by instructions in the software that are carried out by the computer. The software may be divided into two separate parts; one part for carrying out the preferred methods; and another part to manage the user interface between the latter and the user. The software may be stored in a computer readable medium, including the storage devices described below, for example. The software is loaded into the computer from the computer readable medium, and then executed by the computer. The use of the computer readable medium comprising the computer program in conjunction with the computer preferably effects an advantageous apparatus for implementing the preferred methods in accordance with the embodiments of the invention.

The computer system 200 comprises a computer module 201, input devices such as a keyboard 202 and mouse 203, output devices including a printer 215 and a display device 214. A Modulator-Demodulator (Modem) transceiver device 216 is used by the computer module 201 for communicating to and from a communications network 220, for example connectable via a telephone line 221 or other functional medium. The modem 216 can be used to obtain access to the Internet, and other network systems, such as a Local Area Network (LAN) or a Wide Area Network (WAN).

The computer module 201 typically includes at least one processor unit 205, a memory unit 206, for example formed from semiconductor random access memory (RAM) and read only memory (ROM), input/output (I/O) interfaces including a video interface 207, and an I/O interface 213 for the keyboard 202 and mouse 203 and optionally a joystick (not illustrated), and an interface 208 for the modem 216. A storage device 209 is provided and typically includes a hard disk drive 210 and a floppy disk drive 211. A magnetic tape drive (not illustrated) may also be, used. A CD-ROM drive 212 is typically provided as a non-volatile source of data. The components 205 to 213 of the computer module 201, typically communicate via an interconnected bus 204 and in a manner which results in a conventional mode of operation of the computer system 200 known to those in the relevant art. Examples of computers on which the embodiments can be practised include UBM-PC's and compatibles, Sun Sparcstations or alike computer systems evolved therefrom.

Typically, the application program of the preferred embodiments is resident on the hard disk drive 210 and read and controlled in its execution by the processor 205. Intermediate storage of the program and any data fetched from the network 220 may be accomplished using the semiconductor memory 206, possibly in concert with the hard disk drive 210. In some instances, the application program may be supplied to the user encoded on a CD-ROM or floppy disk and read via the corresponding drive 212 or 211, or alternatively may be read by the user from the network 220 via the modem device 216. Still further, the software can also be loaded into the computer system 200 from other computer readable medium including magnetic tape, a ROM or integrated circuit, a magneto-optical disk, a radio or infra-red transmission channel between the computer module 201 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The preferred methods may alternatively be implemented in dedicated hardware such as one or more integrated circuits performing the functions or sub functions of the method. Such dedicated hardware may include graphic processors, digital signal processors, or one or more microprocessors and associated memories.

Industrial Applicability

It is apparent from the above that the embodiments of the invention are applicable to the computer graphics and related industries.

The foregoing describes only some embodiments of the present invention, and modifications and/or changes can be made thereto without departing from the scope and spirit of the invention, the embodiments being illustrative and not restrictive.

I claim:

1. A method of augmenting meta-data associated with a digital image, wherein the meta-data comprises at least one meta-data element, the method comprising:

adding one of a plurality of self-describing attribute tags to said at least one meta-data element, said self-describing attribute tag indicating whether said meta-data element, and a corresponding similarly identified meta-data element from a further digital image should be retained or discarded in a case where the two images are combined, wherein the retention or discarding of the meta-data elements is dependent on the configuration of the meta-data elements.

2. A method as claimed in claim 1, wherein the self describing attribute tag is a tag which indicates that the meta-data elements in question should both be discarded in a case where the two images are combined.

3. A method as claimed in claim 1, wherein the self describing attribute tag is a tag which indicates that the meta-data elements in question should both be retained individually in a case where the two images are combined.

4. A method as claimed in claim 1, wherein the self describing attribute tag is a tag which indicates that the meta-data elements in question should be retained as a single element in a case where values of the meta-data elements are the same, or otherwise discarded in a case where the two images are combined.

5. A method as claimed in claim 1, wherein in the event the image has associated therewith a meta-data element having no self describing attribute tag, then the method further comprises the step of:

supplying a default self describing attribute tag to the meta-data element which has no self describing attribute tag.

6. A method as claimed in claim 5, wherein the default self describing attribute tag is a tag which indicates that the meta-data elements in question should be retained as a single element in a case where values of the meta-data elements are the same, or otherwise discarded in a case where the images are combined.

7. A method of augmenting meta-data associated with a digital image, wherein the meta-data comprises at least one meta-data element, the method comprising:

adding one of a plurality of self describing attribute tags to said at least one meta-data element, said self-describing attribute tag indicating whether said meta-data element should be retained or discarded in a case where the digital image is transformed, wherein the retention or discarding of the meta-data element is dependent on the configuration of the meta-data element.

8. A method as claimed in claim 7, wherein the self describing attribute tag is a tag which indicates that the meta-data element in question should be discarded in a case where the image is transformed.

9. A method as claimed in claim 7, wherein the self describing attribute tag is a tag which indicates that the meta-data element in question should be retained in a case where the image is transformed.

10. A method as claimed in claim 7, wherein in the event the image has associated therewith a meta-data element having no attribute tag, then the method further comprises the step of:

supplying a default self describing attribute tag to the meta-data element which has no attribute tag.

11. A method of combining meta-data associated with a plurality of images, wherein the images each have associated therewith meta-data comprising at least one corresponding meta-data element having associated therewith one of a plurality of attribute tags which indicate whether corresponding meta-data element should be retained or discarded in a case where the images are combined, the method comprising the steps of:

reading the attribute tag of each meta-data element to identify whether the corresponding meta-data element should be retained or discarded; and combining one or more similar meta-data elements associated with the images, and retaining or discarding the combined meta-data elements and one or more further meta-data elements, depending on the attribute tags corresponding to those meta-data elements.

12. A method as claimed in claim 11, wherein the attribute tag is a tag which indicates that the meta-data elements in question should be discarded in a case where the images are combined.

13. A method as claimed in claim 11, wherein the attribute tag is a tag which indicates that the meta-data elements in question should be retained in case where the images are combined.

14. A method as claimed in claim 11, wherein the attribute tag is a tag which indicates that the meta-data elements in question should be retained as a single element in a case where their values are the same, or otherwise discarded in a case where the images are combined.

15. A method as claimed in claim 11, wherein in the event the image has associated therewith a meta-data element having no attribute tag, then the method comprises the step of:

supplying a default attribute tag to the meta-data element which has no attribute tag.

16. A method as claimed in claim 15, wherein the default attribute tag is a tag which indicates that the meta-data elements in question should be retained as a single element in a case where values of the meta-data elements are the same, or otherwise discarded, in a case where the images are combined.

17. A method of retaining meta-data associated with a digital image, wherein the image has associated therewith meta-data comprising at least one meta-data element having associated therewith one of a plurality of attribute tags which indicate whether the meta-data element should be retained or discarded in a case where the image is transformed, the method comprising the steps of:

reading the attribute tag of the meta-data element to identify whether the meta-data element should be retained or discarded; and retaining the meta-data element of the image depending on the attribute tag corresponding to the meta-data element, wherein the retention of the meta-data element is dependent on the configuration of each meta-data element.

18. A method as claimed in claim 17, wherein the attribute tag is a tag which indicates that the manner of retention is that the meta-data element in question should be discarded in a case where the image is transformed.

19. A method as claimed in claim 17, wherein the attribute tag is a tag which indicates that the manner of retention is that the meta-data element in question should be retained in a case where the image is transformed.

20. A method as claimed in claim 17, wherein in the event the image has associated therewith a meta-data element having no attribute tag, then the method further comprises the step of:

supplying a default attribute tag to the meta-data element which has no attribute tag.

21. An apparatus for augmenting meta-data associated with a digital image, wherein the meta-data comprises at least one meta-data element, the apparatus comprising:

a processor for adding one of a plurality of self-describing attribute tags to said at least one meta-data element, said self-describing attribute tag indicating whether said meta-data element and a corresponding similarly identified meta-data element from another digital image should be retained or discarded in a case where the two images are combined, wherein the retention or discarding of the meta-data elements is dependent on the configuration of the meta-data elements.

22. An apparatus for augmenting meta-data associated with a digital image, wherein the meta-data comprises at least one meta-data element, the apparatus comprising:
   a processor for adding one of a plurality of self describing attribute tags to said at least one meta-data element, said self-describing attribute tag indicating whether said meta-data element should be retained or discarded in a case where the digital image is transformed, wherein the retention or discarding of the meta-data element is dependent on the configuration of the meta-data element.

23. An apparatus for combining meta-data associated with a plurality of images, wherein the images each have associated therewith meta-data comprising at least one corresponding meta-data element having associated therewith one of a plurality of attribute tags which indicates whether the corresponding meta-data element is to be retained or discarded in a case where the images are combined, the apparatus comprising:
   a reading device that reads the attribute tag of each meta-data element to identify whether the corresponding meta-data element should be retained or discarded; and
   a processor for combining one or more similar meta-data elements associated with the images, and for retaining or discarding the combined meta-data elements and one or more further meta-data elements depending on the attribute tags associated with those meta-data elements.

24. An apparatus for retaining meta-data associated with a digital image, wherein the image has associated therewith meta-data comprising at least one meta-data element having associated therewith one of a plurality of attribute tags which indicate whether the corresponding meta-data element should be retained or discarded in the case where the image is transformed, the apparatus comprising:
   a reading device that reads the attribute tag of each meta-data element to identify whether the corresponding meta-data element should be retained or discarded; and
   a processor for retaining each meta-data element of the image depending on the attribute tag of each corresponding meta-data element, wherein the retention of each meta-data element is dependent on the configuration of each meta-data element.

25. A computer-readable medium including a computer program for augmenting meta-data associated with a digital image, wherein the meta-data comprises at least one meta-data element, the computer program comprising:
   code for adding one of a plurality of self-describing attribute tags to at least one meta-data element, said self-describing attribute tag indicating whether said meta-data element and a corresponding similarly identified meta-data element from a further digital image should be retained or discarded in a case where the two images are combined, wherein the retention or discarding of the meta-data elements is dependent on the configuration of each meta-data element.

26. A computer-readable medium including a computer program for augmenting meta-data associated with a digital image, wherein the meta-data comprises at least one meta-data element, the computer program comprising:
   code for adding one of a plurality of a self describing attribute tags to at least one meta-data element, said self-describing attribute tag indicating whether said meta-data element should be retained or discarded in a case where the digital image is transformed, wherein the retention or discarding of the meta-data element is dependent on the configuration of the meta-data element.

27. A computer-readable medium including a computer program for combining meta-data associated with a plurality of images, wherein the images each have associated therewith meta-data comprising at least one corresponding meta-data element having associated therewith one of a plurality of attribute tags which indicate whether the corresponding meta-data element should be retained or discarded in a case where images are combined, the computer program comprising:
   code for reading the attribute tag of each meta-data element to identify whether the corresponding meta-data element should be retained or discarded; and
   code for combining one or more similar meta-data elements associated with the images, and retaining or discarding the combined meta-data elements and one or more further meta-data elements, depending on the attribute tags associated with those meta-data elements.

28. A computer-readable medium including a computer program for retaining meta-data associated with a digital image, wherein the image has associated therewith meta-data comprising at least one meta-data element having associated therewith one of a plurality of attribute tags which indicate whether the meta-data element should be retained or discarded in a case where the image is transformed, the computer program comprising:
   code for reading the attribute tag of each meta-data element to identify whether the meta-data element should be retained or discarded; and
   code for retaining each meta-data element of the image depending on the attribute tag associated with each meta-data element, wherein the retention of each meta-data element is dependent on the configuration of each meta-data element.

* * * * *

UNITED STATES PATENT AND TRADEMARK OFFICE
CERTIFICATE OF CORRECTION

PATENT NO. : 6,937,234 B1 Page 1 of 1
APPLICATION NO. : 09/612440
DATED : August 30, 2005
INVENTOR(S) : Long It is certified that error appears in the above-identified patent and that said Letters Patent is hereby corrected as shown below:

COLUMN 1:
Lines 48 and 63, "meta data" should read -- meta-data --.

COLUMN 2:
Lines 1, 34 and 43, "metadata" should read -- meta-data--;
Lines 21 and 56, "digital-image" should read -- digital image --; and
Lines 24 and 61, "an" should read -- a --.

COLUMN 3:
Line 43, "that" should be deleted; and
Line 48, "And" should read -- An --; and "of," should read -- of --.

COLUMN 4:
Lines 46 and 47, "meta data" should read -- meta-data --.

COLUMN 5:
Line 4, "are" should read -- is --; and
Line 33, "meta data" should read -- meta-data --.

COLUMN 6:
Line 18, "alike" should read -- like --.

COLUMN 7:
Line 58, "whether" should read -- whether a --.

COLUMN 8:
Line 10, "in" should read -- in a --.

Signed and Sealed this

Fifth Day of December, 2006

JON W. DUDAS
*Director of the United States Patent and Trademark Office*